US009116452B2

(12) United States Patent
Koyatsu et al.

(10) Patent No.: US 9,116,452 B2
(45) Date of Patent: Aug. 25, 2015

(54) IMAGE PROCESSING APPARATUS WHICH PERFORMS COLOR CONVERSION BASED ON METALLIC LEVEL DESIGNATED

(71) Applicant: FUJI XEROX CO., LTD., Minato-ku, Tokyo (JP)

(72) Inventors: Jun Koyatsu, Kanagawa (JP); Masahiko Kubo, Kanagawa (JP); Hidetoshi Kawashima, Kanagawa (JP); Toshifumi Takahira, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 44 days.

(21) Appl. No.: 13/768,550

(22) Filed: Feb. 15, 2013

(65) Prior Publication Data

US 2014/0043623 A1 Feb. 13, 2014

(30) Foreign Application Priority Data

Aug. 8, 2012 (JP) ................................ 2012-176059

(51) Int. Cl.
*G06F 3/12* (2006.01)
*G03G 15/01* (2006.01)
*G03G 15/00* (2006.01)

(52) U.S. Cl.
CPC ........ *G03G 15/0121* (2013.01); *G03G 15/6585* (2013.01)

(58) Field of Classification Search
None
See application file for complete search history.

(56) References Cited

U.S. PATENT DOCUMENTS

| | | | | |
|---|---|---|---|---|
| 3,802,381 | A * | 4/1974 | O'Neill et al. | 399/30 |
| 2004/0233463 | A1* | 11/2004 | Hersch et al. | 358/1.9 |
| 2011/0221805 | A1* | 9/2011 | Yoshida et al. | 347/9 |
| 2012/0113476 | A1* | 5/2012 | Yoshida et al. | 358/2.1 |
| 2014/0043625 | A1* | 2/2014 | Koyatsu et al. | 358/1.9 |

FOREIGN PATENT DOCUMENTS

| | | | |
|---|---|---|---|
| JP | 62-067558 | A | 3/1987 |
| JP | 2006-050347 | A | 2/2006 |
| JP | 2006-317633 | A | 11/2006 |

* cited by examiner

*Primary Examiner* — Vincent Rudolph
*Assistant Examiner* — Richa Mishra
(74) *Attorney, Agent, or Firm* — Sughrue Mion, PLLC

(57) ABSTRACT

A metallic color conversion unit performs color conversion on an input color value so that a color of a colorimetric value of a print result when a printer performs printing by using each of at least one process color toner by each corresponding amount, which is a conversion result obtained by performing the color conversion on the input color value in accordance with a metallic level designated, and by using a toner including a metallic particle by an amount, which is obtained by a metallic amount calculation unit in accordance with the designated metallic level, becomes close to a color of a colorimetric value of a print result when the printer performs the printing by using each of the at least one process color toner by each corresponding amount, which is a conversion result obtained by converting the input color value by a normal color conversion unit.

3 Claims, 10 Drawing Sheets

| PRINT MODE | PROCESS COLOR LUT | METALLIC TONER AMOUNT CALCULATION TABLE |
|---|---|---|
| NORMAL MODE (NO METALLIC) | NORMAL LUT | — |
| "LOW" METALLIC FEEL | LOW METALLIC LUT | LOW METALLIC TABLE |
| "HIGH" METALLIC FEEL | HIGH METALLIC LUT | HIGH METALLIC TABLE |

FIG. 9

| PRINT MODE | PROCESS COLOR LUT | METALLIC TONER UPPER LIMIT AMOUNT Mtmax |
|---|---|---|
| NORMAL MODE (NO METALLIC) | NORMAL LUT | 0 |
| "LOW" METALLIC FEEL | LOW METALLIC LUT | 50 |
| "HIGH" METALLIC FEEL | HIGH METALLIC LUT | 100 |

IMAGE PROCESSING APPARATUS WHICH PERFORMS COLOR CONVERSION BASED ON METALLIC LEVEL DESIGNATED

CROSS-REFERENCE TO RELATED APPLICATIONS

This application is based on and claims priority under 35 USC 119 from Japanese Patent Application No. 2012-176059 filed Aug. 8, 2012.

BACKGROUND

The present invention relates to an image processing apparatus.

SUMMARY

According to an aspect of the invention, there is provided an image processing apparatus including a printer that performs printing by using at least one process color toner and a toner including a metallic particle; a normal color conversion unit that converts an input color value into an amount of each of the at least one process color toner corresponding to a color reproduction characteristic of the printer when the printer performs the printing without the toner including the metallic particle; a metallic amount calculation unit that calculates an amount of the toner including the metallic particle for each of metallic levels; a metallic level reception unit that receives designation of the metallic level; a metallic color conversion unit that performs color conversion on the input color value so that a color of a colorimetric value of a print result when the printer performs the printing by using each of the at least one process color toner by each corresponding amount, which is a conversion result obtained by performing the color conversion on the input color value in accordance with the metallic level designated in the metallic level designation reception unit, and by using the toner including the metallic particle by the amount, which is obtained by the metallic amount calculation unit in accordance with the designated metallic level, becomes close to a color of a colorimetric value of a print result when the printer performs the printing by using each of the at least one process color toner by each corresponding amount, which is a conversion result obtained by converting the input color value by the normal color conversion unit; and a print execution unit that, if a metallic mode is designated, causes the printer to execute the printing by inputting to the printer the amount of each of the at least one process color toner, which is a conversion result obtained by converting the input color value by the metallic color conversion unit and corresponding to the metallic level designated in the metallic level designation reception unit, and the amount of the toner including the metallic particle obtained by the metallic amount calculation unit in accordance with the metallic level.

BRIEF DESCRIPTION OF THE DRAWINGS

An exemplary embodiment of the present invention will be described in detail based on the following figures, wherein:

FIG. 9 illustrates selection of a color conversion LUT and a metallic toner upper limit amount for each print mode according to a modification;

DETAILED DESCRIPTION

An image processing apparatus according to an exemplary embodiment of the invention is described below with reference to the drawings.

Figure 1:
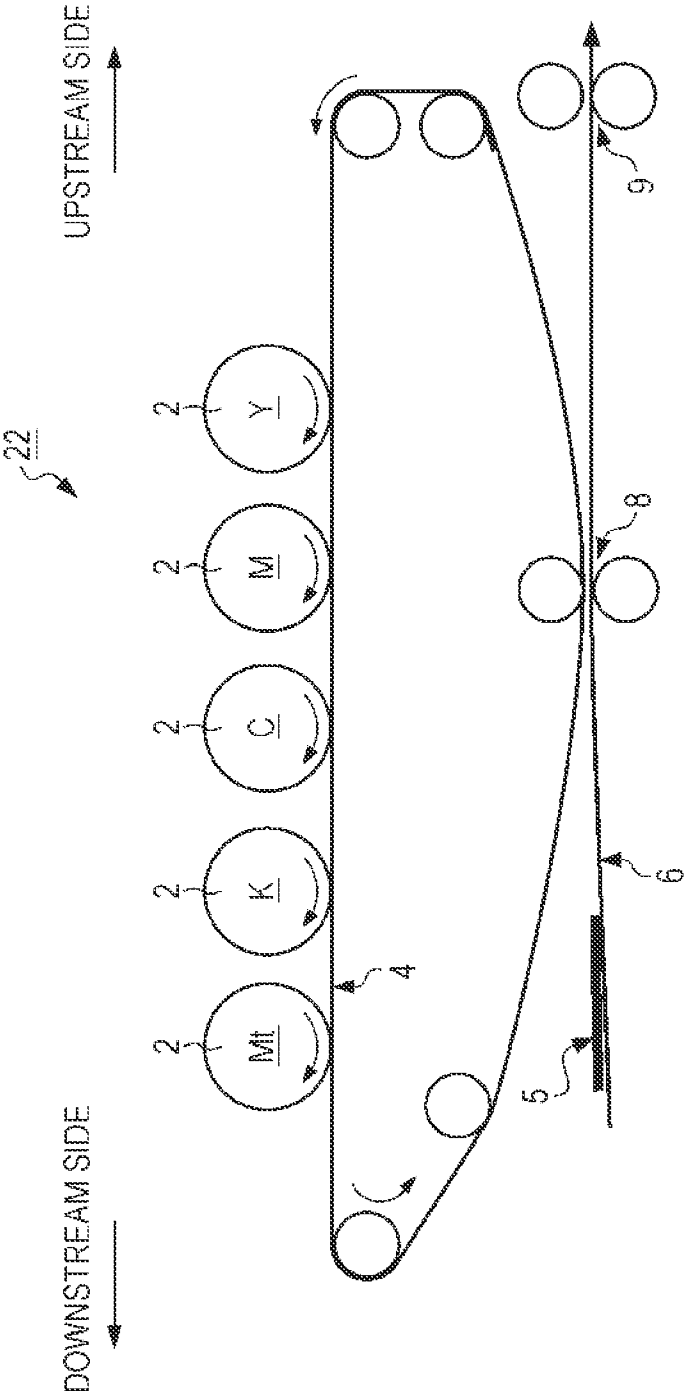
FIG. 1 schematically illustrates an exemplary configuration of a print engine included in an image processing apparatus according to an exemplary embodiment.

FIG. 1 schematically illustrates an exemplary configuration of a print engine 22 included in an image processing apparatus according to this exemplary embodiment. The print engine 22 in this example is an electrophotographic full-color print engine with an intermediate transfer body, and uses toners of respective colors as color materials. The print engine 22 has tandem photoconductor arrangement. The photoconductor arrangement includes a group of photoconductors 2 for process color toners of yellow (Y), magenta (M), cyan (C), and black (K), and a photoconductor 2 for a metallic toner Mt arranged downstream of the photoconductors 2 for the process color toners. The photoconductor 2 for the metallic toner Mt adds a metallic feel.

The metallic feel is a metallic shiny appearance. A metallic luster feel provided by regular reflection of light from a smooth metal surface, and a sparkle feel which is brilliant shining provided in accordance with changes in direction of incident light on fine cut surfaces of metal etc. facing various directions or a collection of metal pieces are collectively called metallic feel.

It is known that if the metallic toner Mt is the lowermost toner layer which contacts a print medium 5, the metallic luster feel is likely obtained, and in contrast, if the metallic toner Mt is the uppermost toner layer arranged above layers of the process color toners, the sparkle feel is likely obtained. This is because of the following mechanism. In particular, toner particles contained in the uppermost metallic toner layer (for example, fine metal pieces being coated with resin) contained in the uppermost metallic toner layer partly bite into the process color toner layer arranged below the metallic toner layer. However, since the biting direction varies, the orientation of the toner particles may likely vary. Such reflection light from the toner particles in the various directions provides a high sparkle feel. In contrast, the metallic toner particles less likely bite into the surface of a print medium arranged below the lowermost metallic toner layer as compared with the toner layer. Hence, the orientations of many metallic toner particles are likely aligned, and the reflection directions of incident light are likely aligned. This increases the metallic luster feel.

In the example in FIG. 1, toner images respectively formed on the photoconductors 2 are transferred (first transfer) in an aligned manner on an intermediate transfer belt 4 in order of Y, M, C, K, and Mt from the upstream side to the downstream side along a moving direction of the intermediate transfer belt 4. Accordingly, a full-color toner image containing the layer of the metallic toner Mt and the layers of the toners of YMCK arranged below the layer of the metallic toner Mt is formed on the intermediate transfer belt 4. The full-color toner image is transferred (second transfer) on a print medium 5 (for example, a sheet of paper) at a second transfer unit 8. The print medium 5 is transported by a medium transport system 6. Accordingly, the full-color toner image, in which the layer of the metallic toner Mt is formed below the layers of the toners of YMCK, is formed on the surface of the print medium 5. The full-color toner image is fixed to the print medium 5 by a fixing unit 9. That is, the engine configuration is focused on the metallic luster feel.

In the example in FIG. 1, the arrangement order of the process color photoconductors 2 is Y, M, C, and K from the upstream side. However, this order is a mere example. Also, another process color toner of at least one color, such as orange, green, or violet, may be used as an additional color in addition to Y, M, C, and K. In this case, a photoconductor of the additional color is provided upstream of the photoconductor 2 of the metallic toner Mt.

Alternatively, for an engine configuration focused on the sparkle feel, the photoconductor 2 for the metallic toner Mt may be arranged upstream of the group of the photoconductors 2 for YMCK.

An exemplary configuration of the apparatus according to this exemplary embodiment including the print engine illustrated in FIG. 1 is described below. Although it is understood from the following description, a print engine using an intermediate transfer body which is not a belt may be applied. Also, a print engine that directly transfers toner images on photoconductors onto a print medium (not through an intermediate transfer body) may be applied. Also, other than the tandem print engine, a rotary print engine (a type in which different toners are temporarily successively applied on a single photoconductor and images of the toners successively formed accordingly are superposed on an intermediate transfer body) may be applied. Since the rotary type uses only a single photoconductor, the rotary type does not include an array of photoconductors from the upstream side to the downstream side unlike the tandem type in view of the space. However, even with the rotary type, the single photoconductor successively functions as photoconductors for different toners in view of the time. It is assumed that the photoconductors for the respective toners are present from the upstream side to the downstream side in order of application of the toners on the time axis (for periods with the toners applied).

Next, an exemplary configuration of the image processing apparatus according to this exemplary embodiment is described with reference to FIG. 2.

Figure 2:
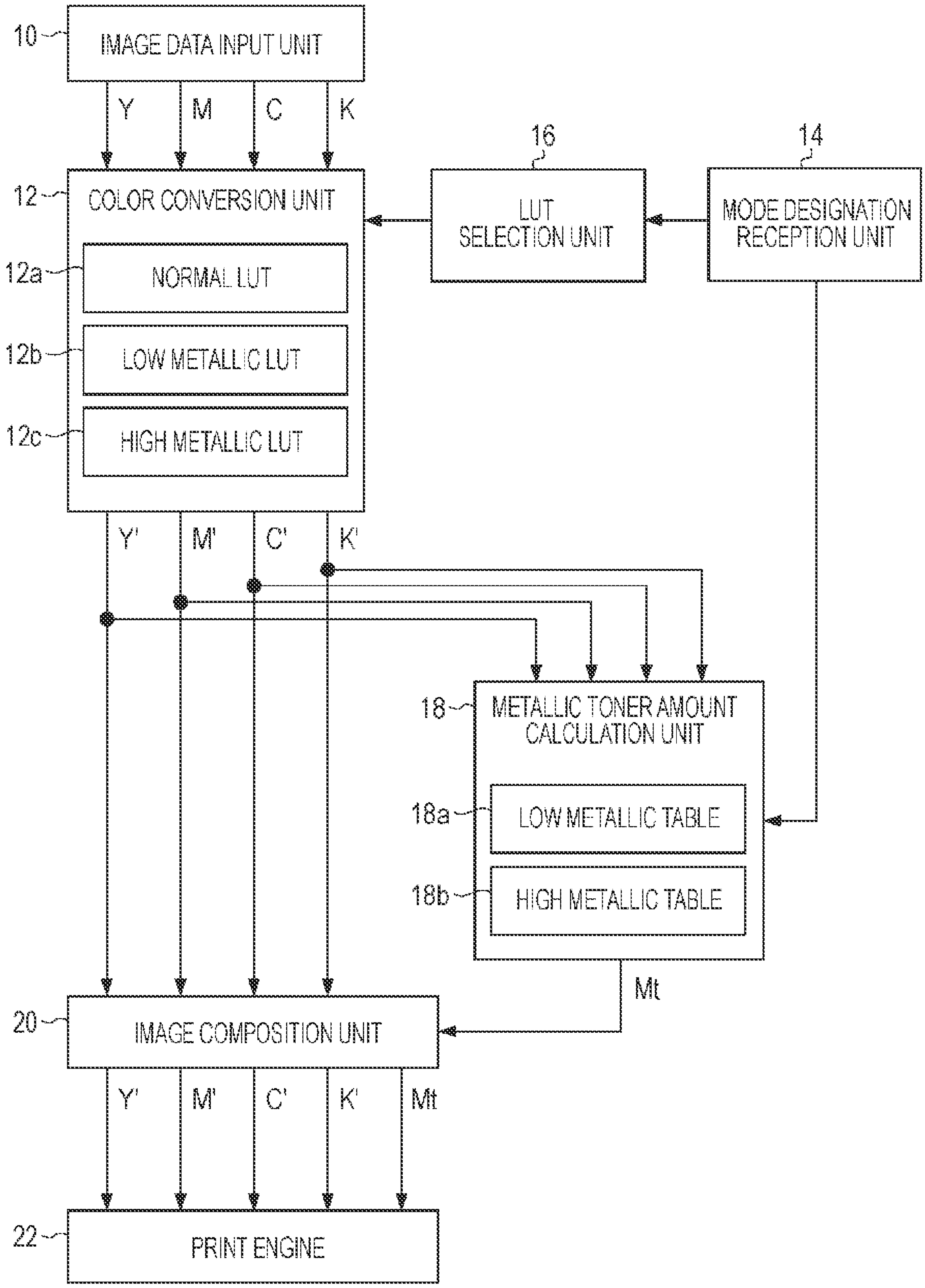
FIG. 2 illustrates an exemplary configuration of major units of the image processing apparatus according to the exemplary embodiment.

In the example in FIG. 2, an image data input unit 10 receives bitmap image data of the four YMCK colors, the data being generated by interpreting print data expressed by a page description language etc., or the data being generated by converting an image of RGB etc. read by a scanner or the like into a (device-independent) YMCK color space with four primary colors for printing. A color conversion unit 12 converts a color value of each pixel, i.e., a pixel value (Y, M, C, K) of the image data into a device-dependent color value (Y', M', C', K') corresponding to a color reproduction characteristic of the print engine 22 (illustrated in FIG. 1). Respective components of the color value (Y', M', C', K') of the process colors after the conversion by the color conversion unit 12 respectively correspond to densities (toner amounts per pixel) of the color toners of Y, M, C, and K. The color value (Y', M', C', K') of each obtained pixel is input to a metallic toner amount calculation unit 18 and an image composition unit 20.

In this exemplary embodiment, the color conversion unit 12 includes a normal look-up table (LUT) 12*a* for color conversion, a low metallic LUT 12*b*, and a high metallic LUT 12*c*. The LUTs 12*a* to 12*c* are tables that hold device-dependent color values (Y', M', C', K') corresponding to input color values (Y, M, C, K). The LUTs 12*a* to 12*c* may be formed of dynamic LUTs (DLUTs) that, when receiving input color values, output device-dependent color values corresponding to the input color values.

The normal LUT 12*a* is a LUT used when printing is performed only with the process color toners but without the metallic toner Mt. The normal LUT 12*a* is similar to a LUT used in a typical printer of related art which uses only process color toners.

The low metallic LUT 12*b* and the high metallic LUT 12*c* are LUTs respectively used for adding "low" level and "high" level metallic feels. The LUTs 12*a* and 12*b* are described later in more detail.

A mode designation reception unit 14 is a unit that receives designation for a print mode from a user. The apparatus according to this exemplary embodiment has a normal mode and a metallic mode as the print mode. The normal mode is a mode in which printing is performed only with the process color toners but without the metallic toner Mt. In contrast, the metallic mode is a mode in which printing is performed by using the metallic toner Mt in addition to the process color toners. In the metallic mode, designation for a metallic setting value indicative of a level of a metallic feel is received. In the example in FIG. 2, the metallic setting value has one of two steps of "low" and "high." However, this is a mere example, and the metallic setting value may have one of multiple steps, for example, three or more steps. In this case, the metallic LUTs (12*b* and 12*c*) included in the color conversion unit 12 and metallic toner amount calculation tables (18*a* and 18*b*) included in the metallic toner amount calculation unit 18 (described later) have to be prepared by the same number as the number of steps of the metallic setting value.

A LUT selection unit 16 selects one of the three LUTs 12*a* to 12*c* in accordance with the mode designation received by the mode designation reception unit 14. For example, when the normal mode is designated, the normal LUT 12*a* is selected. When the metallic mode is designated, the metallic LUT 12*b* or 12*c* corresponding to the simultaneously designated metallic setting value is selected (for example, if the metallic setting value is "high," the high metallic LUT 12*c* is selected).

The metallic toner amount calculation unit 18 calculates the amount of the metallic toner that is applied to each pixel when printing is performed in the metallic mode. In this exemplary embodiment, the metallic toner amount to be calculated corresponds to the metallic setting value designated in the mode designation reception unit 14. That is, if other conditions are equivalent, as the metallic setting value is higher (i.e., as the metallic feel is stronger), the amount of the metallic toner to be applied to each pixel is increased (to be more specific, the metallic toner amount when the metallic setting value is high is "equal to or larger than" the metallic toner amount when the metallic setting value is low).

Hence, in the example in FIG. 2, the metallic toner amount calculation unit 18 includes the low metallic table 18*a* and the high metallic table 18*b*. The tables 18*a* and 18*b* are tables in which the metallic toner amounts Mt are defined as functions of total area coverage (TAC, area coverage being dot area ratio) that is the sum of the respective components of the color value (Y', M', C', K') of the process colors after the color conversion. In the following description, the total area coverage of all toners including both the process color toners and the metallic toner is expressed as "TAC," and the total area coverage of only the process color toners is expressed as "TAC(C)." When the metallic toner amount (area coverage) is expressed as Mt, TAC=TAC(C)+Mt.

Figure 3:
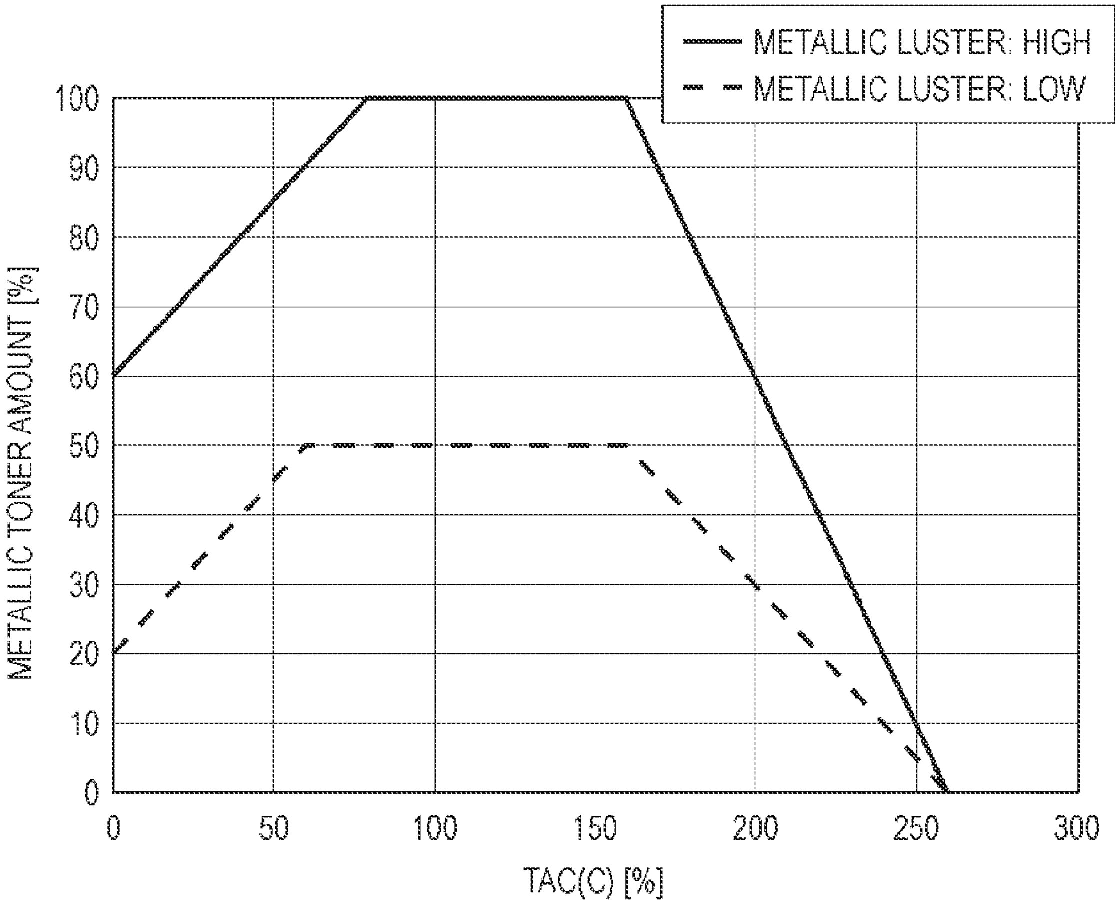
FIG. 3 illustrates an exemplary function for obtaining a metallic toner amount from a total amount TAC(C) of process color toners.

FIG. 3 illustrates exemplary functions expressed by the low metallic table 18*a* and the high metallic table 18*b*. In FIG. 3, a broken-line graph indicates an exemplary function of the low metallic table 18*a*, and a solid-line graph indicates an exemplary function of the high metallic table 18*b*. With the function of the low metallic table 18*a*, the metallic toner amount Mt (expressed by the unit of % for area coverage) is linearly increased in a range from 20% to 50% when TAC(C) of the process color toners is in a range from 0% to 60%. The metallic toner amount Mt is a constant value of 50% when TAC(C) is in a range from 60% to 160%. The metallic toner amount Mt is linearly decreased in a range from 50% to 0% when TAC(C) is in a range from 160% to 260%. Also, with the function of the high metallic table 18*b*, the metallic toner amount Mt is linearly increased in a range from 60% to 100% when TAC(C) of the process color toners is in a range from 0% to 80%. The metallic toner amount Mt is a constant value of 100% when TAC(C) is in a range from 80% to 160%. The metallic toner amount Mt is linearly decreased in a range from 100% to 0% when TAC(C) is in a range from 160% to 260%. This is an example in which the density (area coverage) of 260% serves as a total amount limit value TAC(lim) of all toners including the metallic toner. The total amount limit value TAC(lim) is an upper limit of the total amount of the toners to be applied to a pixel. The electrophotographic print engine provides control so that the total amount of the toners per pixel does not exceed the total amount limit value for avoiding a fixing failure and for saving the toners.

Figures 4, 5:
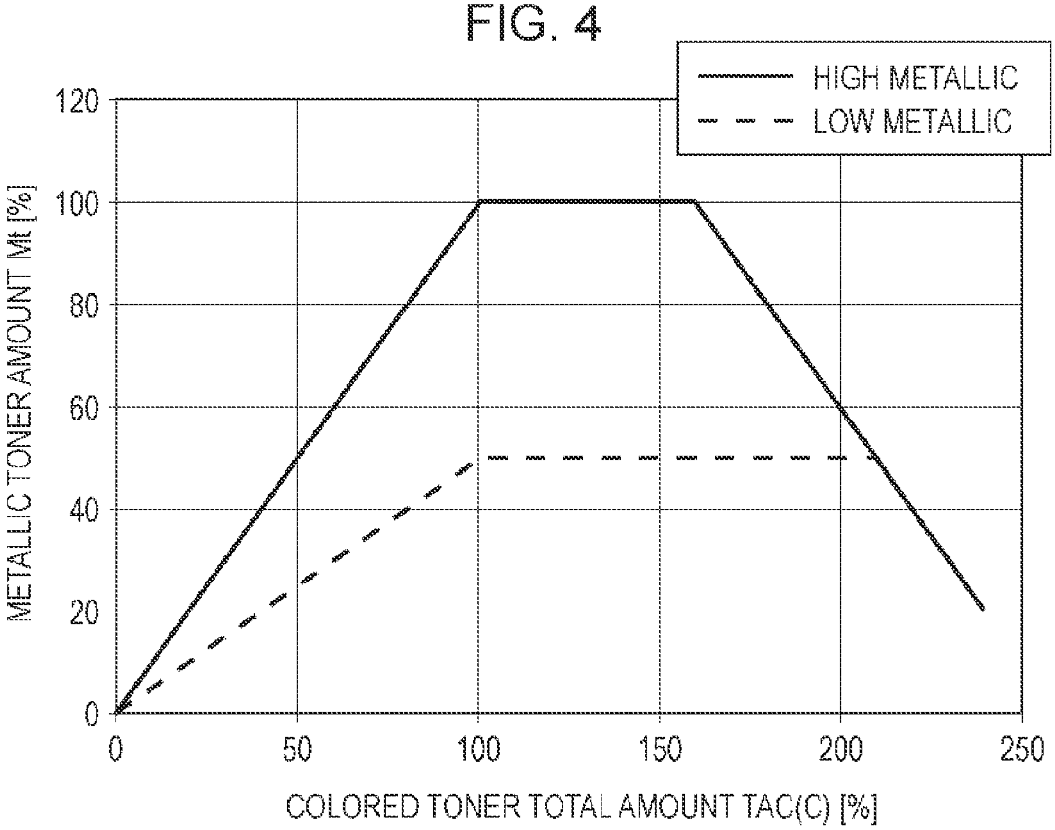
FIG. 4 illustrates another exemplary function for obtaining a metallic toner amount from a total amount TAC(C) of process color toners.
FIG. 5 illustrates selection of a color conversion LUT and a metallic toner amount calculation table for each print mode according to the exemplary embodiment.

FIG. 4 illustrates other exemplary functions expressed by the low metallic table 18*a* and the high metallic table 18*b*. With the function of the low metallic table 18*a* illustrated in FIG. 4, the metallic toner amount Mt is linearly increased in a range from 0% to 50% when TAC(C) of the process color toners (in the drawing, written as "colored toner") is in a range from 0% to 100%. The metallic toner amount Mt is a constant value of 50% when TAC(C) is in a range from 100% to 210%. The metallic toner amount Mt is linearly decreased in a range from 50% to 20% when TAC(C) is in a range from 210% to 240%. Also, with the function of the high metallic table 18*b*, the metallic toner amount Mt is linearly increased in a range from 0% to 100% when TAC(C) is in a range from 0% to 100%. The metallic toner amount Mt is a constant value of 100% when TAC(C) is in a range from 100% to 160%. The metallic toner amount Mt is linearly decreased in a range from 100% to 20% when TAC(C) is in a range from 160% to 240%. In this example, while the total amount limit value TAC(lim) of all toners including the metallic toner is 260% like the example in FIG. 3, the total amount of the process color toners is limited to be 240% or lower, so that the metallic toner is applied even to a color with a high color saturation by at least 20%.

In the examples in FIGS. 3 and 4, the metallic toner amount Mt is increased in accordance with the increase in TAC(C) in a range where TAC(C) is low because of the following reason. With the configuration in FIG. 1, in which the metallic toner is arranged at the layer being closest to the print medium (at the lowermost layer), as the process color toner layers on the metallic toner layer become thick the metallic luster feel of the metallic toner layer is shielded by the above process color toner layers by a larger thickness. In order to compensate an increase in shielding level of the metallic luster feel due to the increase in thickness of the process color toner layers and to obtain a uniform metallic luster feel, the metallic toner amount Mt is increased.

Also, in the examples in FIGS. 3 and 4, the metallic toner amount Mt is gradually decreased in accordance with the increase in TAC(C) in a range where TAC(C) exceeds 160%, so as not to exceed the total amount limit value TAC(lim). In particular, while the metallic toner amount Mt is 100% at maximum for the high metallic feel (metallic luster: high), if TAC(C) exceeds 160%, the toner total amount TAC(C) exceeds 260% of the total amount limit value TAC(lim) as long as Mt is 100%. Hence, the metallic toner amount Mt is decreased by an amount of the increase in TAC(C). Also, Mt for the low metallic feel is decreased in accordance with the increase in TAC(C) in a range where TAC(C) is high.

Application of the metallic toner to a pixel with the total amount of the process color toners being 0%, i.e., to a blank part of paper, is determined by a user. The tables in FIGS. 3 and 4 may be selectively used.

The low metallic table 18*a* and the high metallic table 18*b* for obtaining the metallic amount Mt may be created through an experiment etc., so that a constant metallic feel (for example, metallic luster feel) is attained in a wide range of TAC(C) as possible.

Although the detail is described later, the above-described low metallic LUT 12*b* and high metallic LUT 12*c* are created to correspond to the low metallic table 18*a* and high metallic table 18*b* created as described above.

Herein, FIG. 5 provides the correlation between the modes designated in the mode designation reception unit 14 and the LUTs etc. used by the color conversion unit 12 and the metallic toner amount calculation unit 18. Referring to FIG. 5, in the normal mode, the color conversion unit 12 uses the normal LUT 12*a*, and since the metallic toner is not used, the metallic toner amount calculation unit 18 does not perform calculation for Mt. In the metallic mode, if "low" is designated for the metallic setting value, the color conversion unit 12 uses the low metallic LUT 12*b*, and the metallic toner amount calculation unit 18 uses the low metallic table 18*a*. In the metallic mode, if "high" is designated for the metallic setting value, the color conversion unit 12 uses the high metallic LUT 12*c*, and the metallic toner amount calculation unit 18 uses the high metallic table 18*b*.

Referring back to the description with reference to FIG. 2, the metallic toner amount calculation unit 18 selects the low metallic table 18*a* if the user designates "low" for the metallic setting value through the mode designation reception unit 14, or the metallic toner amount calculation unit 18 selects the high metallic table 18*b* if "high" is designated for the metallic setting value. Then, a metallic toner amount Mt corresponding to TAC(C) which is the sum of the respective components of the color value (Y', M', C', K') of each pixel after the color conversion is read from the selected table 18*a* or 18*b* for each pixel. The value of Mt for each pixel obtained as described above is input to the image composition unit 20.

The image composition unit 20 supplies the respective color components Y', M', C', and K' of the process colors input from the color conversion unit 12 and the metallic toner amount Mt input from the metallic toner amount calculation unit 18 for each pixel to the print engine 22. The print engine 22 controls exposure to light of the corresponding photoconductors 2 in accordance with the respective components Y', M', C', K', and Mt, and hence forms an image.

Next, an exemplary processing procedure of the image processing apparatus in FIG. 2 is described with reference to FIGS. 6 and 7. Before the procedure is started, it is assumed that the user designates the print mode (normal mode or metallic mode) through the mode designation reception unit 14 and if the metallic mode is designated, the metallic setting value (for example, "high" or "low") indicative of the metallic level is input.

Figure 6:
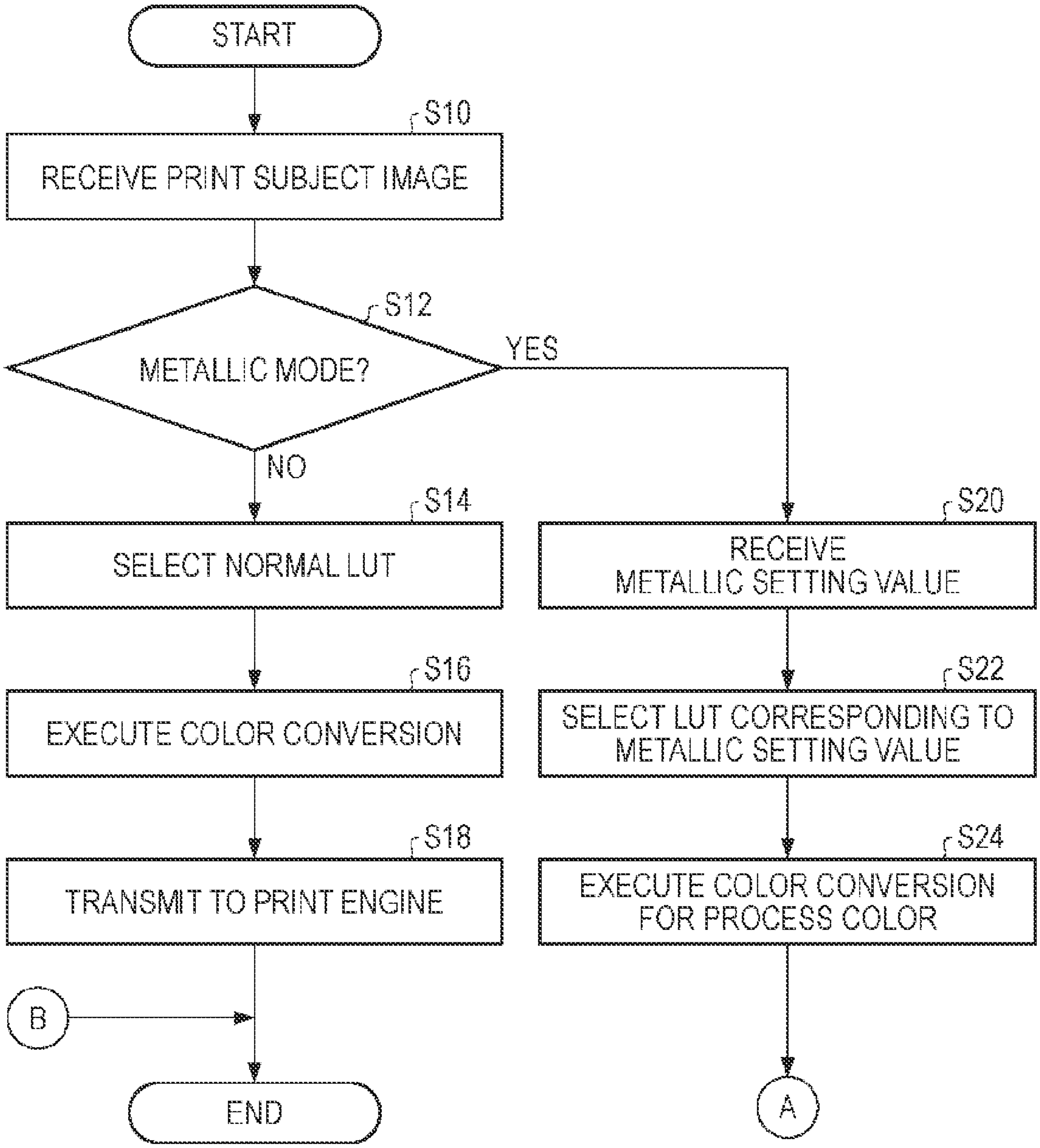
FIG. 6 illustrates part of an exemplary processing procedure of the apparatus according to the exemplary embodiment.

In the procedure in FIG. 6, when image data, which is a print subject, is input to the image data input unit 10 (S10), if the mode is not the metallic mode (if NO in S12, i.e., if the normal mode is designated), the LUT selection unit 16 selects the normal LUT 12*a* (S14). The color conversion unit 12 executes the color conversion on the image data as the print subject, by using the normal LUT 12*a* (S16). The image data of the conversion result is transmitted to the print engine 22 through the image composition unit 20, and is printed on paper (S18).

If it is judged that the metallic mode is designated in S12, the LUT selection unit 16 receives the metallic setting value from the mode designation reception unit 14 (S20), and selects the LUT 12*b* or 12*c* corresponding to the setting value (S22). The color conversion unit 12 executes the color conversion on the image data of the print subject, by using the selected LUT 12*b* or 12*c* (S24).

Figure 7:
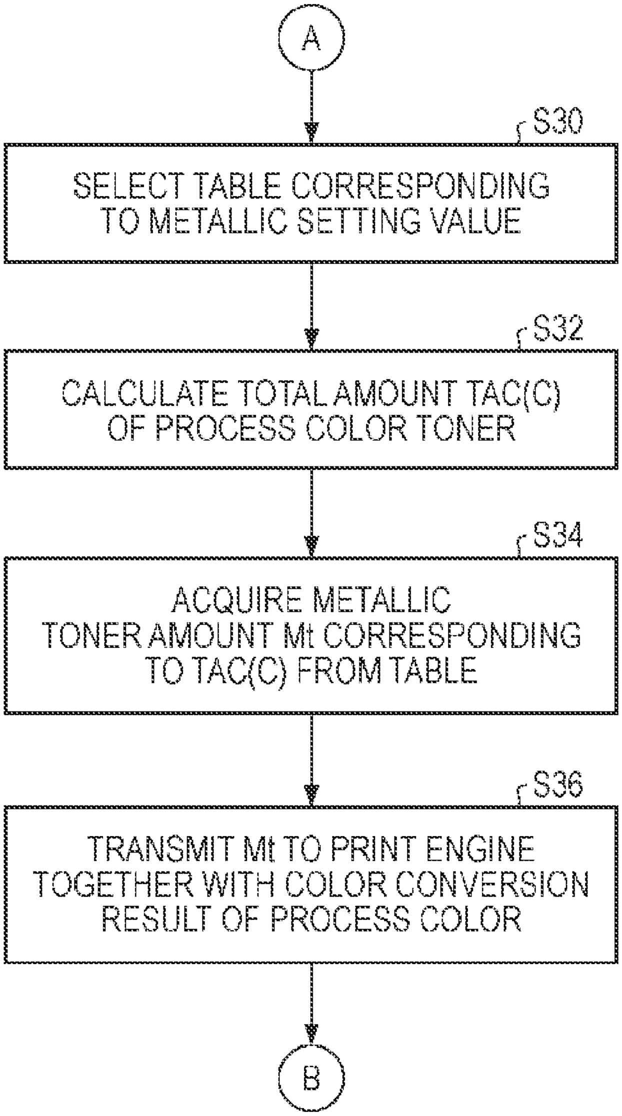
FIG. 7 illustrates the residual part (mostly a procedure of a metallic toner amount calculation unit) of the exemplary processing procedure of the apparatus according to the exemplary embodiment.

Then, the procedure continues to FIG. 7. The metallic toner amount calculation unit 18 selects the table corresponding to the metallic setting value from the low metallic table 18*a* and the high metallic table 18*b* (S30). Also, the metallic toner amount calculation unit 18 calculates the total amount TAC (C) of the process color toners from the color conversion result (Y', M', C', K') output from the color conversion unit 12 (S32), acquires the value of the metallic toner amount Mt corresponding to the value of TAC(C) from the selected table 18*a* or 18*b* (S34), and transmits the value to the image composition unit 20. The image composition unit 20 transmits the color conversion result (Y', M', C', K') output from the color conversion unit 12 and the metallic toner amount Mt output from the metallic toner amount calculation unit 18 to the print engine 22, and causes the print engine 22 to execute printing (S36).

Next, exemplary processing of creating the color conversion LUTs respectively corresponding to the metallic setting values is described with reference to FIG. 8. This creation processing is executed typically when the image processing apparatus including the print engine 22 is designed or manufactured, and the created LUTs (12*a* and 12*b*) are installed on the product of the image processing apparatus.

As a precondition for the processing, the print engine 22 and the color conversion LUT (the normal LUT 12*a*) for normal printing without the metallic toner are already designed, and the table (18*a* or 18*b*) for obtaining the metallic toner amount Mt corresponding to the process color toner total amount TAC(C) is also already designed for each of the metallic setting values. For example, the designed print engine 22 is prototyped and the print engine 22 performs the work in FIG. 8. Accordingly, the color conversion LUT corresponding to each of the metallic setting values is created.

Figure 8:
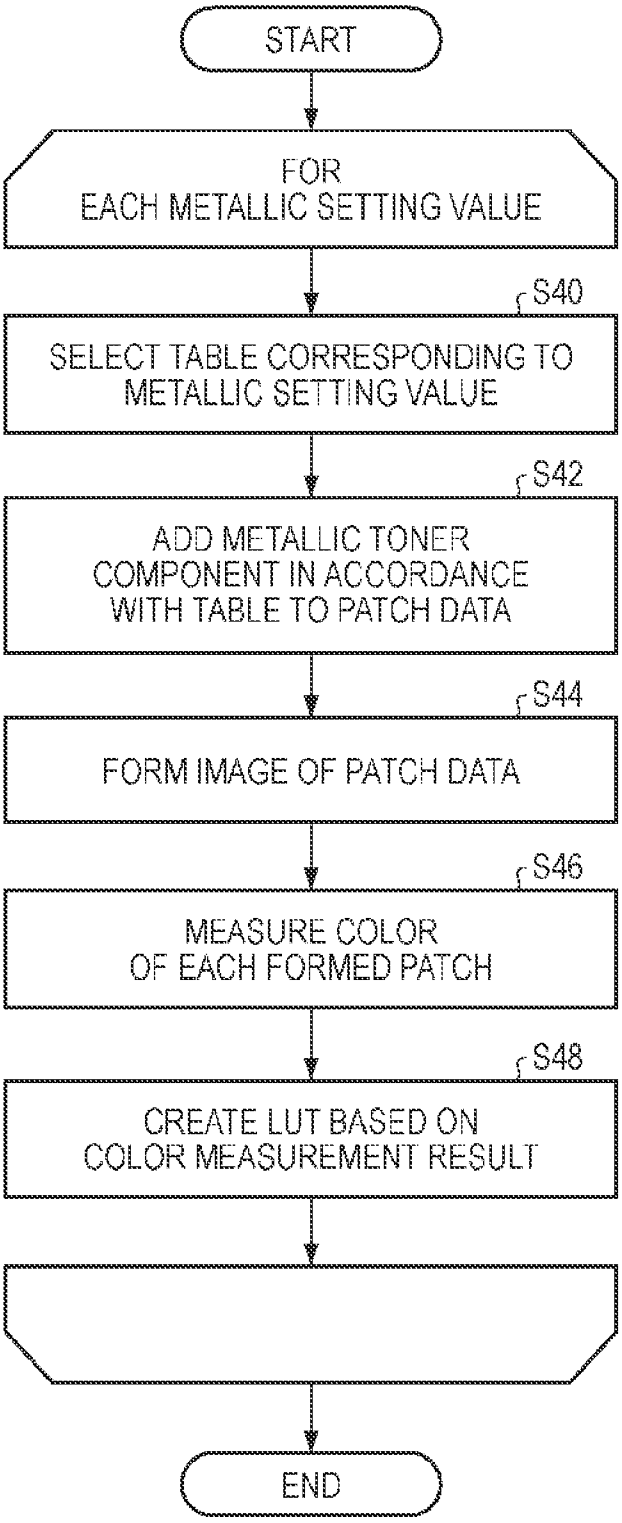
FIG. 8 illustrates an exemplary method of creating a color conversion LUT corresponding to each metallic setting value.

The procedure in FIG. 8 is executed for each metallic setting value. For example, in the example in FIG. 2, the work in FIG. 8 is executed for each of the "low" and "high" metallic setting values.

In the procedure in FIG. 8, a table (for example, one of 18*a* and 18*b*) corresponding to the metallic setting value of interest is selected as a table that is used by the metallic toner amount calculation unit 18 (S40).

Then, the image composition unit 20 creates patch data by adding the metallic toner amount Mt as the metallic component corresponding to the selected table to color patch data (Y, M, C, K) used for creating the normal LUT 12*a* (S42).

The color patch is a subrange (patch) having one of various color values (Y, M, C, K) generated by changing the density (area coverage) of the respective components of Y, M, C, and K from 0% to 100% by a predetermined change width of, for example, 10% or 5%. The color value (Y, M, C, K) of the color patch is a value supplied to the print engine 22. In the example in FIG. 2, the color value is a device-dependent color value (Y', M', C', K'). Therefore, the color value of the process colors in the patch is written as (Y', M', C', K'). In S42, the metallic toner amount Mt corresponding to TAC(C), which is the sum of the respective components of the color value, is obtained from the table selected in S40, for the color value (Y', M', C', K') of each patch included in the patch data. Then, the component of the corresponding metallic toner amount Mt is added to the color value of each patch in the patch data. Accordingly, patch data including metallic component (Y', M', C', K', Mt) is generated.

The patch data with the metallic component is printed by the print engine 22 (S44). Accordingly, multiple color patches in which the metallic toner Mt is added to various process color values (Y', M', C', K') by amounts corresponding to the metallic setting value, for which the LUT is created, are formed on a medium (paper, intermediate transfer belt, etc.), for which the patches are created.

Then, the colors of the formed patches are measured by a colorimeter (S46). In this color measurement, the color of each patch is obtained as a value of a device-independent colorimetric system, such as L*a*b etc. of International Commission in Illumination (CIE).

With the above-described work, when one patch is focused, Mt is uniquely determined from the table 18*a* or 18*b* selected in accordance with the metallic setting value, for the original process color value (Y', M', C', K') of the patch. Then, the color of the print result of the patch data with the uniquely determined Mt component added (Y', M', C', K', Mt) is measured. Hence, a colorimetric value (L*, a*, b*) is obtained. In this way, the correlation between the original process color value (Y', M', C', K') and the colorimetric value (L*, a*, b*) when the metallic toner corresponding to the metallic setting value is applied is obtained.

Based on the correlation between the original process color value (Y', M', C', K') and the colorimetric value (L*, a*, b*), the LUT (12*b* or 12*c*) corresponding to the metallic setting value is created by the typical method of creating the color conversion LUT (S48).

For example, in a color management system compliant with International Color Consortium (ICC), the color value (Y, M, C, K) of an image input to the image data input unit 10 is converted into a color value of a device-independent colorimetric system, such as L*a*b* by an input profile corresponding to a characteristic of the apparatus that generates the input image, and the device-independent color value is further converted into a color value (Y', M', C', K') for the print engine 22 by an output profile corresponding to a color reproduction characteristic of the print engine 22. The correlation between (Y', M', C', K') and (L*, a*, b*) obtained in S46 is used as the output profile, and is coupled with the input profile. Accordingly, the color conversion LUT (12_b_ or 12_c_) corresponding to the metallic setting value is obtained.

Also for the normal LUT 12_a_, a color patch without the metallic toner is printed and the color thereof is measured. Hence, the correlation between (Y', M', C', K') and (L*, a*, b*) indicative of the output profile is obtained, and is coupled with the input profile. Thus, the normal LUT 12_a_ is created. Accordingly, regarding a color (colorimetric value) without the metallic feel of the print result for the same input color value (Y, M, C, K), the color when the normal LUT 12_a_ is used is equivalent to the color when the LUT (12_b_ or 12_c_) corresponding to each metallic setting value is used.

The color conversion LUT for the metallic component is prepared in addition to the normal LUT 12_a_ as described above, because since a metallic toner typically has a color (for example, it is difficult to realize a silver toner which is colorless and only has metallic luster), if the metallic toner is added for adding the metallic feel, the color (colorimetric value) of the print result is changed from the case without the metallic toner. Even when the color value of the process colors is the same, if the amount of the metallic toner to be added is changed, the color is changed. Therefore, the color conversion LUT is prepared for each metallic setting value.

When the metallic toner is added, a color reproduction range (gamut) may be narrowed as compared with the case without the metallic toner. That is, the range for colorimetric values of the color patch group created by the procedure in FIG. 8 is a gamut corresponding to the metallic setting value. The gamut may be narrower than the gamut without the metallic toner. In this case, by using a known gamut compression technique, each device-independent color value (L*, a*, b* etc.) of the input color may be mapped to a color value in the gamut (the range of the colorimetric values of the patch group) obtained in S46. Accordingly, a LUT that realizes a print result with the metallic toner being closest to the color of the input color as possible (i.e., having a substantially equivalent color while the gamut compression is taken into consideration) is provided.

Next, a modification of the metallic toner amount calculation unit 18 is described. In the above-described exemplary embodiment, the metallic toner amount calculation unit 18 calculates the metallic toner amount by using one of the table 18_a_ and 18_b_ respectively corresponding to the metallic setting values. In contrast, with this modification, only an upper limit of the metallic toner amount is determined for each metallic setting value, and the metallic toner amount is calculated by using the upper limit.

For example, in an example in FIG. 9, values of 50% and 100% are used for upper limit amounts Mtmax of the metallic toner, respectively for the "low" and "high" metallic setting values. However, the numeric values of 50 and 100 are mere examples.

The apparatus configuration of this modification may be basically similar to that illustrated in FIG. 2. However, the metallic toner amount calculation unit 18 has the metallic toner upper limit amounts for the "low" and "high" metallic feels instead of the tables 18_a_ and 18_b_, and executes a procedure in FIG. 10 instead of the procedure in FIG. 7. The processing procedure of units other than the metallic toner amount calculation unit 18 may take the procedure in FIG. 6.

Figure 10:
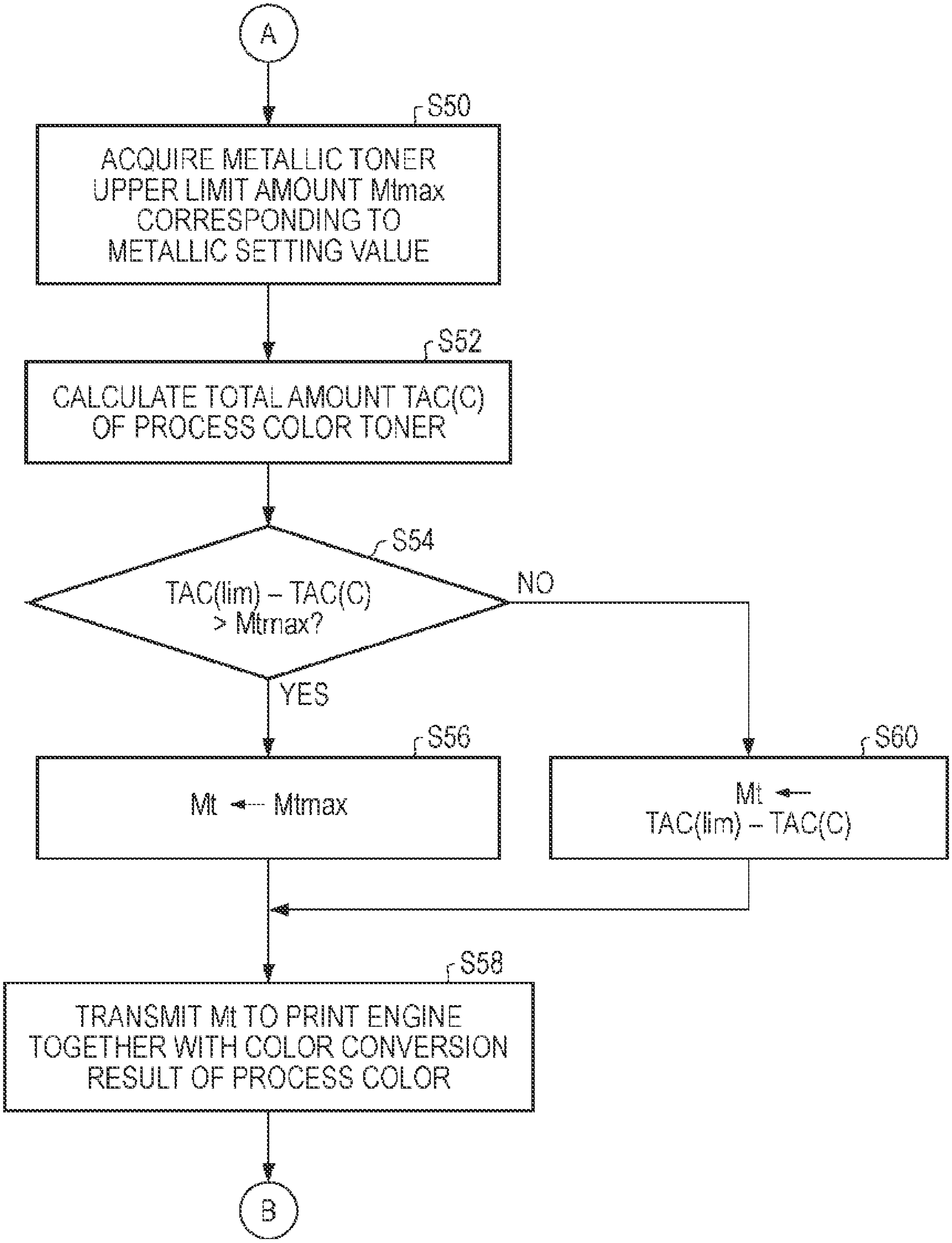
FIG. 10 illustrates an example procedure of a metallic toner amount calculation unit according to a modification.

In the procedure in FIG. 10, the metallic toner amount calculation unit 18 acquires the metallic toner upper limit amount Mtmax corresponding to the metallic setting value (S50), and calculates the total amount TAC(C) of the process color toners from the color conversion result (Y', M', C', K') output from the color conversion unit 12 (S52). Then, TAC(C) is subtracted from the total amount limit value TAC(lim) of all toners including the metallic toner, and it is judged whether or not the subtraction result is larger than the metallic toner upper limit amount Mtmax acquired in S50 (S54). If the judgment result is YES, even if the metallic toner amount is the upper limit mount Mtmax, the total amount of the toners becomes equal to or smaller than the total amount limit value TAC(lim). In this case, the metallic toner amount calculation unit 18 employs the upper limit amount Mtmax for the metallic toner amount Mt to be added (S56), and transmits the value Mt to the image composition unit 20. The image composition unit 20 transmits the color conversion result (Y', M', C', K') output from the color conversion unit 12 and the metallic toner amount Mt output from the metallic toner amount calculation unit 18 to the print engine 22, and causes the print engine 22 to execute printing (S58).

If the judgment result in S54 is NO, and if the metallic toner amount is the upper limit amount Mtmax, the total amount of the toners may exceed the total amount limit value TAC(lim). Hence, in this case, a maximum value in a range where the total amount of the toners does not exceed the total amount limit value TAC(lim), i.e., {TAC(lim)-TAC(C)} is employed as the metallic toner amount Mt (S60). Then, the image composition unit 20 transmits the color conversion result (Y', M', C', K') output from the color conversion unit 12 and the metallic toner amount Mt output from the metallic toner amount calculation unit 18 to the print engine 22, and causes the print engine 22 to execute printing (S58).

Figure 11:
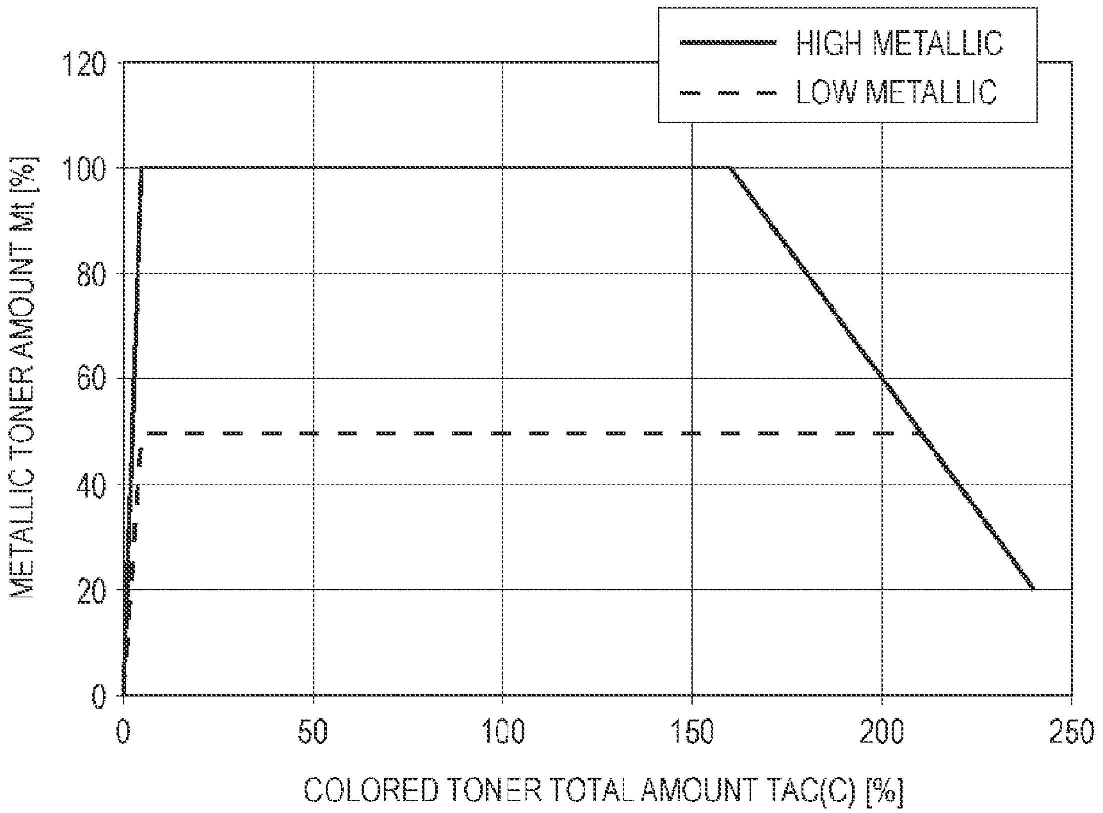
FIG. 11 illustrates another exemplary function for obtaining a metallic toner amount from a total amount TAC(C) of process color toners.

This procedure is for adding the metallic toner by the maximum amount as long as the condition that the total amount of the toners does not exceed the total amount limit value TAC(lim) and the metallic toner amount is equal to or smaller than the upper limit value corresponding to the metallic setting value. FIG. 11 illustrates the relationship between the amount of the metallic toner and the total amount of the process color toners applied in this procedure.

The exemplary embodiment and modification of the invention have been described above. However, the exemplary embodiment and modification are mere examples, and may be modified in various ways within the scope of the invention. For example, in the above-described exemplary embodiment, the compensation and the other calculation are performed on the pixel basis. However, the unit of the calculation is not limited to the pixel. For example, calculation similar to that described above may be performed for every predetermined unit region, such as a block formed of a predetermined number of pixels. Also, according to the exemplary embodiment and modification of the invention, the metallic feel may be added to the image of the print result although a specific plate is not prepared for the metallic toner.

Also, when the metallic toner layer is located at the lowermost layer (the layer adjacent to a print medium) (for example, when the photoconductor arrangement in FIG. 1 is employed), the color (colorimetric value) may be different from that when the metallic toner is located at the uppermost layer, although the metallic toner is added by the same amount. Hence, the color conversion LUT for each metallic setting value may be created for each of the case in which the metallic toner layer is at the lowermost layer and the case in which the metallic toner layer is at the uppermost layer. The mounted print engine 22 may select the corresponding LUT depending on the case. Accordingly, printing is provided even if the print engine 22 mounted on the image processing apparatus is replaced with one having a different application order of the metallic toner.

Also, the table (18*a* or 18*b*) for obtaining the metallic toner amount Mt from TAC(C) and the upper limit value for the metallic toner amount Mt (in the case of the modification) in the case in which the metallic toner layer is located at the lowermost layer may be different from those in the case in which the metallic toner layer is located at the uppermost layer.

Also, in the above-described example, the color space for the input image data is YMCK; however, it is obvious that the mechanism of the above-described exemplary embodiment and modification may be applied to image data expressed by another color space, such as RGB.

The information processing function part (the function module group other than the print engine 22) of the image processing apparatus exemplarily described above is realized by causing a general-purpose computer to execute a program, which expresses the processing of the respective function modules of the apparatus. For example, the computer has a circuit configuration in which a microprocessor such as a central processing unit (CPU), memories (first storages) such as a random-access memory (RAM) and a read-only memory (ROM), a hard disk drive (HDD) controller that controls a HDD, various input/output (I/O) interfaces, a network interface that provides control for connection to a network such as a local area network, etc., are connected to each other through, for example, a bus. Also, a disk drive for reading from and/or writing to a transportable disk recording medium such as a compact disc (CD) or a digital versatile disc (DVD), a memory reader and/or writer for reading from and/or writing to a transportable non-volatile recording medium of any of various standards such as a flash memory, etc., may be connected to the bus through, for example, the I/O interface. The program in which the processing contents of the respective function modules exemplarily described above are written is saved in a fixed memory such as the hard disk drive, through the recording medium such as the CD or DVD, or through a communication system such as the network, and the program is installed in the computer. The program stored in the fixed memory is read out by the RAM, and is executed by the microprocessor such as the CPU. Accordingly, the function modules exemplarily described above are realized.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:

a printer that performs printing by using at least one process color toner and a toner including a metallic particle;

a normal color conversion unit that converts an input color value into an amount of each of the at least one process color toner corresponding to a color reproduction characteristic of the printer when the printer performs the printing without the toner including the metallic particle;

a metallic amount calculation unit that calculates an amount of the toner including the metallic particle for each of metallic levels;

a metallic level reception unit that receives designation of the metallic level as one of a first metallic level and a second metallic level;

a metallic color conversion unit that performs color conversion on the input color value so that a color of a colorimetric value of a print result when the printer performs the printing by using each of the at least one process color toner by each corresponding amount, which is a conversion result obtained by performing the color conversion on the input color value in accordance with a first look up table of metallic setting values corresponding to the first metallic level or a second look up table of metallic setting values corresponding to the second metallic level designated in the metallic level designation reception unit, and by using the toner including the metallic particle by the amount, which is obtained by the metallic amount calculation unit in accordance with the designated metallic level, becomes close to a color of a colorimetric value of a print result when the printer performs the printing by using each of the at least one process color toner by each corresponding amount, which is a conversion result obtained by converting the input color value by the normal color conversion unit; and a print execution unit that, if a metallic mode is designated, causes the printer to execute the printing by inputting to the printer the amount of each of the at least one process color toner, which is a conversion result obtained by converting the input color value by the metallic color conversion unit and corresponding to the metallic level designated in the metallic level designation reception unit, and the amount of the toner including the metallic particle obtained by the metallic amount calculation unit in accordance with the metallic level.

2. The image processing apparatus according to claim 1, wherein the metallic amount calculation unit calculates the amount of the toner including the metallic particle under a predetermined calculation rule in accordance with a total amount of the at least one process color toner corresponding to the conversion result of the input color value obtained by the metallic color conversion unit, wherein the calculation rule is determined such that the amount of the toner including the metallic particle is increased as the total amount of the at least one process color toner is increased within a range where the sum of the amount of the toner including the metallic particle to be calculated and the total amount of the at least one process color toner serving as the basis for the amount of the toner including the metallic particle to be calculated does not exceed a total amount limit value which is an upper limit value of a total amount of the toner including the metallic particle and the process color toner and the amount of the toner including the metallic particle to be calculated does not exceed an upper limit value which is predetermined in accordance with the metallic level.

3. An image processing apparatus, comprising:

a printer that performs printing by using at least one process color toner and a toner including a metallic particle;

a normal color conversion unit that converts an input color value into an amount of each of the at least one process color toner corresponding to a color reproduction characteristic of the printer when the printer performs the printing without the toner including the metallic particle;

a metallic level reception unit that receives designation of a metallic level as one of a first metallic level and a second metallic level;

a metallic amount calculation unit that calculates an amount of the toner including the metallic particle for each of the first metallic level and the second metallic level, the amount of the toner including the metallic particle are defined as functions of a total area coverage that is a sum of the respective components of the amount of each of the at least one process color toner converted by the normal color conversion unit;

a metallic color conversion unit that converts an input color value into the amount of each of the at least one process color toner by using a first look up table corresponding to a color reproduction characteristic of the printer, when the printer performs the printing with the toner including the first metallic level of the metallic particle, or by using a second look up table corresponding to a color reproduction characteristic of the printer, when the printer performs the printing with the toner including the second metallic level of the metallic particle;

a print execution unit that, if a metallic mode is designated, causes the printer to execute the printing by inputting to the printer the amount of each of the at least one process color toner, which is a conversion result obtained by converting the input color value by the metallic color conversion unit and corresponding to the metallic level designated in the metallic level designation reception unit, and the amount of the toner including the metallic particle obtained by the metallic amount calculation unit in accordance with the metallic level.

* * * * *